United States Patent
Saage et al.

(10) Patent No.: US 6,494,933 B1
(45) Date of Patent: Dec. 17, 2002

(54) METHOD OF UTILIZING SECONDARY RAW MATERIALS CONTAINING IRON, ZINC AND LEAD

(75) Inventors: Eberhard Saage, Freiberg/OT Zug (DE); Uwe Hasche, Weissenborn (DE); Wolfgang Dittrich, Brand-Erbisdorf (DE); Diethart Langbein, Freiberg (DE)

(73) Assignees: B. U. S. Zinkrecycling Freiberg GmbH, Freiberg (DE); FNE Forschungsinstitut fur Nichteisen-Metalle, Freiberg (DE)

( * ) Notice: Subject to any disclaimer, the term of this patent is extended or adjusted under 35 U.S.C. 154(b) by 0 days.

(21) Appl. No.: 09/670,717

(22) Filed: Sep. 28, 2000

(30) Foreign Application Priority Data

Sep. 28, 1999 (DE) .......................... 199 46 430

(51) Int. Cl.⁷ ................................ C22B 7/02
(52) U.S. Cl. .................... 75/662; 75/694; 75/770; 75/961
(58) Field of Search .......................... 75/770, 961, 694, 75/662

(56) References Cited

U.S. PATENT DOCUMENTS

| | | |
|---|---|---|
| 4,396,424 A | 8/1983 | Yatsunami et al. |
| 4,758,268 A | 7/1988 | Bishop et al. |
| 4,940,487 A | 7/1990 | Lugscheider et al. |
| 5,906,671 A | 5/1999 | Weinwurm et al. |

FOREIGN PATENT DOCUMENTS

| | | | |
|---|---|---|---|
| DE | 3427 631 C2 | | 2/1985 |
| DE | 43 39 591 A1 | | 5/1995 |
| EP | 0972 849 A1 | | 1/1990 |
| EP | 0464 874 A1 | | 1/1992 |
| EP | 0 654 538 A1 | | 5/1995 |
| EP | 0781 856 A1 | | 7/1997 |
| EP | 0960 952 A1 | | 12/1999 |
| FR | 1 594 084 A | | 6/1970 |
| GB | 2043695 A | * | 10/1980 |
| JP | 09157766 A | | 6/1997 |
| WO | WO 97/18338 | | 5/1997 |
| WO | WO 98/04755 | | 2/1998 |
| WO | WO-9804755 | * | 2/1998 |

OTHER PUBLICATIONS

Derwent Acc. No. 1982–74110E for SU 876761 B, published Oct. 30, 1981 by Kolesnikov et al. Abstract only.*
Database WPI XP–002158447 No Date.
German Search Report No date.

* cited by examiner

Primary Examiner—Roy King
Assistant Examiner—Tima McGuthry-Banks
(74) Attorney, Agent, or Firm—Sughrue Mion, PLLC

(57) ABSTRACT

The invention relates to a method of utilizing secondary raw materials containing iron, zinc and lead, preferably steel-making dusts, in a rotary tubular furnace customarily equipped for the rolling process, with basically adjusted rolling slag. By reducing the portion of the carbon carriers in the burden, the energy balance of the rolling process is improved on one hand, and the throughput of the rotary tubular furnace used is increased on the other hand. By improving the quality of the rolling slag, the capability of utilizing the same is favored.

16 Claims, No Drawings

METHOD OF UTILIZING SECONDARY RAW MATERIALS CONTAINING IRON, ZINC AND LEAD

FIELD OF THE INVENTION

The invention relates to a method of utilizing secondary raw materials containing iron, zinc and lead, preferably steelmaking dusts, in a rotary tubular furnace customarily equipped for the rolling process, with basically adjusted rolling slag.

BACKGROUND OF THE INVENTION

It is known that materials containing zinc and lead are mixed with coke breeze (carbon carrier) during the rolling process and are charged to a rotary tubular furnace operating on the counterflow principle. Due to the inclination of the furnace center line and the rotation of the furnace, the material moves to the deeper end of the furnace. The counter-flowing air, which is heated by a burner multiple times, oxidizes the gases resulting from the burdening, whereby the temperature of the gases rises and the furnace chamber and the burden are heated.

When travelling through the furnace, the burden undergoes a change of composition such that carbon reacts with reducible iron oxides first by forming metallic iron, that resulting carbon oxide and solid carbon then react with zinc oxide to form zinc metal, that lead and compounds thereof react correspondingly and that eventually everything vaporizes in correspondence with its vapor pressure ratios. The metallic iron is carburized by excess carbon. The solid residues called rolling slag contain excess coke, carburized metallic iron and a remainder of slag-forming oxides, and also small amounts of zinc. The flue gases lose the content of free oxygen on their way through the furnace. In an ideal rolling operation, the flue gases neither contain $O_2$ nor CO at the gas outlet.

In the previously known basic processes the rolling slags are characterized by eluate values and building-physical properties, which limit the utilization thereof to a few fields of application, such as the construction of waste dumps.

Additional disadvantages of the previously known basically performed rolling processes are:

1. High energy consumption due to high coke growth.
2. Higher energy consumption due to frequent additional firing with a high-grade combustible.
3. Waste of energy due to 5–10% residual coke and metallic iron (>90% of the prerun) in the rolling slag.
4. Occurrence of ferriferous scaffolding at the furnace walls or of iron pellets in the proximity of the discharge area, favored by high carbon contents in the iron sponge.

For avoiding said disadvantages, suggestions are provided in the literature, namely to achieve an oxidation of the rolling slag by blowing up hot air at the slag outlet.

In the method according to U.S. Pat. No 3,66,522 hot air is blown up at the discharge area of a rotary tubular furnace, which is heated to 700° C.–750° C. in a separate recuperator unit, without claiming that the energy required therefor is taken from the process. The temperature in the top-blowing area is to be capable of rising up to 2000° C., which also follows from the flow temperature of the reaction partners. The rolling slag will melt at least partially, it is to be in the form of granules. The method is preferably meant for pyritiferous ores.

Nearly identical with the principles of said method is the known rolling method according to EP 0 654 538. Here, too, hot air of 500–1000° C. is blown into the discharge area of the rotary tubular furnace so as to include the oxidizable constituents of the rolling slag in the energy utilization. By burning excess carbon and metallic iron the temperature of the rolling slag rises up to 1200° C.–1500° C., it is, however, meant to remain crumbly and not to flow out in a melted form. Therefore, the method can only be used in connection with a basic operating mode. For limiting the thermal profile in the gas chamber of the furnace the air volume is so dimensioned, that the flue gas at the uptake of the furnace (charging side for the burden) still contains CO and Zn vapor beside other components, i.e. that it is substoichiometric in view of the combustion. Therefore, a controlled subsequent combustion is necessary. The hot air preparation in this method has been solved in a laborious manner. The waste gases of the subsequent combustion serve the preheating of the combustion air, for which a special recuperator is required, which operates under unfavorable conditions (dust, chlorides, lead). Technical solutions for such a recuperator are not known.

SUMMARY OF THE INVENTION

The invention is based on the object to provide a method of performing a rolling process with basically adjusted slag in normally equipped rolling plants with a justifiable technical expenditure. The method is to operate at a temperature in the rolling slag lower than the previously usual one and without a subsequent combustion of waste gas with air outside the rotary tubular furnace. Further, the energy balance of the rolling process is to be improved and the throughput of the used rotary tubular furnace is to be increased. Further, the quality of the slag is to be improved so that it becomes utilizable in a more versatile manner.

According to the invention these objects are solved by a method according to claim 1. Preferred embodiments are described in the dependent claims.

In the method according to the invention secondary raw materials containing iron, zinc and lead, preferably steelmaking dusts, are processed in a rotary tubular furnace operating on a counterflow principle in view of burden and gas atmosphere, with basically adjusted rolling slag such that the raw materials are mixed and/or agglomerated with a reactive fine-grained carbon carrier, with the quantitative portion of the carbon being strongly substoichiometric in contrast to all carbon-consuming reactions in the burden, that an additional portion of coarse-grained carbon carriers is distributed between the agglomerates, that the total portion of the carbon is <80% of the quantity required by all carbon-consuming reactions in the burden at a rolling temperature of <1150° C. It is preferred that the carbon portion is so dimensioned that the rolling slag does not contain any free carbon (<1%) even without a subsequent oxidation, that a total air volume is supplied to the furnace, which is stoichiometric or respectively hyperstoichiometric in view of all oxidizable gas constituents, i.e. it can do without a special controlled subsequent combustion, that the rolling slag is supplied with cold air in the proximity of the furnace outlet upon reaching a stable run of the furnace in an amount reducing the portion of metallic iron to less than 20%, preferably <10%, and that a high degree of basicity of the rolling slag is adjusted with a high portion of magnesium with $MgO \geqq 0.1\% Cao$ also by adding lime and magnesium containing wastes, such as plaster precipitation sludge.

According to the invention the fine-grained carbon carriers have a diameter of about 0–6 mm, preferably 0–4 mm and most preferred <2 mm. According to the invention the coarse-grained carbon carriers have a diameter of about 0–16 mm, preferably 0–12 mm and most preferred <10 mm.

The method has the advantage that it is completely sufficient to cover an additional need of heat at the outlet of the furnace by deliberately introducing cold air in an amount of 30–40% of the total air volume. The air causes the oxidation of the metallic iron and the generation of heat related therewith. The temperature of the rolling slag can be adjusted to a temperature of <1150° C. by controlling the air volume. The absorbed air volume is controlled by the flue in a known manner. It is to be dimensioned in a way that the flue gas at the uptake of the furnace contains 0.5–2% $O_2$.

In accordance therewith a furnace regime is achieved, in which the quantitative portion of the carbon in the layer of solid matter, i.e. in the furnace burden, is substoichiometric in view of the need of carbon for all carbon-consuming reactions, but allows a total combustion of all constituents in the gas chamber, thereby being stoichiometric or hyperstoichiometric, respectively, in view of the combustion with free $O_2$ in the flue gas.

This principle is rendered advantageous by using a reactive and fine-grained carbon carrier, which also contains small amounts of volatile substances, which is charged to the furnace after having been mixed and/or agglomerated with the fine-grained raw materials and admixtures.

Said principle is further rendered advantageous by being capable of also using waste plasters as basic admixtures allowing a largely troublefree run of the furnace. The latter is additionally improved by the low carbon content of the formed metallic iron and its higher melting point effected thereby.

In accordance with the described operating mode, said principle allows a normal operation also of smaller furnaces largely without additional heating.

The technical realization thereof is effected by carefully dosing and mixing the components and by using an agglomerating plant. Furthermore, an air supplying device is required comprising a fan, measuring and controlling systems and a movable blowing lance. The resulting rolling slags can be used in the field of waste dump construction or in asphalt sub-bases. They are densely sintered in view of the surface, free of carbon (<1%) and only contain small amounts of metallic iron. Their eluate values comply with the legal provisions.

The crumbly rolling slag is granulated or quenched in a water beam upon its discharge from the furnace.

In the method according to the invention the energy balance of the rotary tubular furnace and also the throughput of the utilized rotary tubular furnace are improved by the reduction of the amount of carbon carriers and by the utilization of the energy potential of the metallic iron at the furnace outlet.

DETAILED DESCRIPTION OF THE PREFERRED EMBODIMENT

Zinc and lead containing steelmaking dusts are pelleted by means of petroleum coke having a grain size <2 mm, fine-grained $CaSO_4$-containing admixtures and water. The petroleum coke rate is set such that the pellets contain about 70% of carbon required for reducing the iron, zinc and lead containing compounds. The humidity amounts to 10–12%. To these pellets are added coarse-grained carbon carriers with a grain size of approximately <10 mm. The total amount of carbon is about 75% of the carbon amount required to reduce the iron, zinc and lead containing compounds.

Said self-fluxing pellets are processed together with the coarse-grained carbon carriers in a rotary tubular furnace having a length of 38.5 m and an inner diameter of 2.5 m at an inclination of 3%. A blowing lance is passed through the kiln hood, by means of which air is blown onto the slag via nozzles over a length of 2 m. Said air volume is controlled such that iron contained in the slag is mainly oxidized, that the residual carbon is <1% and that the temperature of the slag is at 1100° C. The total air volume is controlled so as to provide a stoichiometric relationship to all gas components to be oxidized, without the waste gas containing CO.

The slag is granulated and can be used due to its building-physical properties and its eluate quality in the building trade, for example, for asphalt sub-bases or for forming gas-permeable layers in the sanitation of waste dumps. The amount of metallic iron in the slag is about 5 wt.-%.

The waste gas is coarsely purified in the dust chamber. In the subsequent cooling and cleaning of the waste gas, a rolling oxide having a zinc content of about 63% is obtained.

As used herein, the term "rolling" used in the present invention (for example "rolling process", "rolling plants", "rolling slag") does not mean the treatment in a roller press or in a roller mill. Instead, rolling in the context of the present invention means the movement a metal particle undergoes in the process in the rotary tubular furnace. The corresponding German expressions are "Wälzprozess", "Wälzchlacke" etc. The terms may also be translated with the corresponding technical terms in the English language "Waelz process", Waelz plant" and "Waelz slag". It is also clear from the context that "rolling process" means the treatment in the rotary tubular furnace.

The German Application No. 199 46 430.8 from which priority is claimed is incorporated herein by reference.

Although, the invention is described on the basis of at least one preferred embodiment, it is not limited thereto and the scope of protection for the invention is to be determined from the following claims in accordance with applicable principles of law.

What is claimed is:

1. A method of utilizing secondary raw materials containing iron, zinc and lead, in a rotary tubular furnace operating on the counterflow principle in view of burden and gas atmosphere, with basically adjusted rolling slag, comprising the steps of:

mixing and/or agglomerating said raw materials with a reactive fine-grained carbon carrier, with the quantitative portion of the carbon being strongly substoichiometric in contrast to all carbon-consuming reactions in the burden, distributing an additional portion of coarse-grained carbon carriers between said mixed and/or agglomerated raw materials, wherein the total portion of the carbon is less than 80 wt-% of the quantity required by all carbon-consuming reactions in the burden at a rolling temperature of less than 1150° C. wherein said carbon portion is dimensioned such that contains less than 1 wt.-% free carbon even without subsequent oxidation.

2. A method according to claim 1, further comprising supplying said basically adjusted rolling slag with unpreheated air in the proximity of the furnace outlet upon reaching a stable run of the furnace in an amount reducing the portion of metallic iron of the total iron content to less than 20 wt.-%.

3. A method according to claim 1, wherein a high degree of basicity of rolling slag is adjusted with a high portion of magnesium with a ratio of CaO and MgO of at least 0.1 based on CaO in weight percent by adding lime and magnesium containing wastes.

4. A method according to claim 1, wherein a total air volume is supplied to the furnace, which is stoichiometric or hyperstoichiometric, respectively, in view of all oxidizable gas constituents.

5. A method according to claim 4, further comprising supplying said basically adjusted rolling slag with unpreheated air in the proximity of the furnace outlet upon reaching a stable run of the furnace in an amount reducing the portion of metallic iron of the total iron content to less than 20 wt-%.

6. A method according to claim 2, wherein a high degree of basicity of the rolling slag is adjusted with a high portion of magnesium with a ratio of CaO and MgO of at least 0.1 based on CaO in weight percent by adding lime and magnesium containing wastes.

7. A method according to claim 4, wherein a high degree of basicity of the rolling slag is adjusted with a high portion of magnesium with a ratio of CaO and MgO of at least 0.1 based on CaO in weight percent by adding lime and magnesium containing wastes.

8. A method according to claim 5, wherein a high degree of basicity of the rolling slag is adjusted with a high portion of magnesium with a ratio of CaO and MgO of at least 0.1 based on CaO in weight percent by adding lime and magnesium containing wastes.

9. A method according to claim 1,
wherein said secondary raw materials containing iron, zinc and lead, are steel making dusts.

10. A method according to claim 2, wherein the portion of metallic iron of the total iron content is reduced to less than 10 wt-%.

11. A method according to claim 5, wherein said portion of metallic Iron of the total iron content is reduced to less than 10 wt-%.

12. A method of utilizing secondary raw materials containing iron, zinc and lead, in a rotary tubular furnace operating on the counterflow principle in view of burden and gas atmosphere, with basically adjusted rolling slag, comprising the steps of:
mixing and/or agglomerating said raw materials with a reactive fine-grained carbon carrier, with the quantitative portion of the carbon being strongly substoichiometric in contrast to all carbon-consuming reactions in the burden,
distributing an additional portion of coarse-grained carbon carriers between said mixed and/or agglomerated raw materials,
wherein the total portion of the carbon is less than 80 wt-% of the quantity required by all carbon-consuming reactions in the burden at a rolling temperature of less than 1150° C.
wherein a total air volume is supplied to the furnace, which is stoichiometric or hyperstoichiometric, respectively, in view of all oxidizable gas constituents.

13. A method according to claim 12, further comprising supplying said basically adjusted rolling slag is supplied with unpreheated air in the proximity of the furnace outlet upon reaching a stable run of the furnace in an amount reducing the portion of metallic iron of the total iron content to less than 20 wt-%.

14. A method according to claim 12, wherein a high degree of basicity of the rolling slag is adjusted with a high portion of magnesium with a ratio of CaO and MgO of at least 0.1 based on CaO in weight percent by adding lime and magnesium containing wastes.

15. A method according to claim 13, wherein a high degree of basicity of the rolling slag is adjusted with a high portion of magnesium with a ratio of CaO and MgO of at least 0.1 based on CaO in weight percent by adding lime and magnesium containing wastes.

16. A method according to claim 13, wherein said portion of metallic iron of the total iron content is reduced to less than 10 wt-%.

* * * * *

UNITED STATES PATENT AND TRADEMARK OFFICE
CERTIFICATE OF CORRECTION

PATENT NO. : 6,494,933 B1
DATED : December 17, 2002
INVENTOR(S) : Eberhard Saage et al.

It is certified that error appears in the above-identified patent and that said Letters Patent is hereby corrected as shown below:

<u>Title page,</u>
Item [73], Assignee, change "B.U.S Zinkrecycling Freiberg GmbH and FNE Forschungsinstitut fur Nichteisen- Metallie" to -- B.U.S Zinkrecycling Freiberg GmbH --

Signed and Sealed this

Fifteenth Day of February, 2005

JON W. DUDAS
*Director of the United States Patent and Trademark Office*